US008928643B2

(12) United States Patent
Lueder

(10) Patent No.: US 8,928,643 B2
(45) Date of Patent: Jan. 6, 2015

(54) MEANS AND CIRCUIT TO SHORTEN THE OPTICAL RESPONSE TIME OF LIQUID CRYSTAL DISPLAYS

(75) Inventor: Ernst Lueder, Scottsdale, AZ (US)

(73) Assignee: Ernst Lueder, Scottsdale, AZ (US)

( * ) Notice: Subject to any disclaimer, the term of this patent is extended or adjusted under 35 U.S.C. 154(b) by 174 days.

(21) Appl. No.: 12/931,513

(22) Filed: Feb. 3, 2011

(65) Prior Publication Data

US 2012/0200550 A1 Aug. 9, 2012

(51) Int. Cl.
*G06F 3/038* (2013.01)
*G09G 5/00* (2006.01)
*G09G 3/36* (2006.01)

(52) U.S. Cl.
CPC ...... *G09G 3/3648* (2013.01); *G09G 2300/0852* (2013.01); *G09G 2320/0252* (2013.01)
USPC .......................................................... 345/211

(58) Field of Classification Search
USPC ........................ 345/30–73, 87–104, 204–215
See application file for complete search history.

(56) References Cited

U.S. PATENT DOCUMENTS

| | | | | |
|---|---|---|---|---|
| 6,005,646 | A * | 12/1999 | Nakamura et al. | 349/33 |
| 6,952,244 | B2 * | 10/2005 | Cairns et al. | 349/43 |
| 7,209,191 | B2 * | 4/2007 | Chang | 349/38 |
| 7,880,841 | B2 * | 2/2011 | Qi | 349/119 |
| 8,063,859 | B2 * | 11/2011 | Kimura | 345/76 |
| 2003/0107543 | A1 * | 6/2003 | Nakano et al. | 345/90 |
| 2003/0117352 | A1 * | 6/2003 | Kimura | 345/87 |
| 2005/0184948 | A1 * | 8/2005 | Halfant | 345/98 |
| 2005/0225522 | A1 * | 10/2005 | Wu et al. | 345/87 |
| 2005/0225525 | A1 * | 10/2005 | Wu et al. | 345/89 |
| 2005/0280641 | A1 * | 12/2005 | Kobayashi | 345/204 |
| 2006/0038761 | A1 * | 2/2006 | Shen et al. | 345/92 |
| 2006/0290614 | A1 * | 12/2006 | Nathan et al. | 345/76 |
| 2008/0158119 | A1 * | 7/2008 | Park et al. | 345/87 |
| 2008/0180385 | A1 * | 7/2008 | Yoshida et al. | 345/102 |
| 2008/0284719 | A1 * | 11/2008 | Yoshida | 345/102 |
| 2008/0284768 | A1 * | 11/2008 | Yoshida et al. | 345/208 |
| 2008/0284929 | A1 * | 11/2008 | Kimura | 349/38 |
| 2010/0007637 | A1 * | 1/2010 | Takatori | 345/204 |
| 2010/0156945 | A1 * | 6/2010 | Yoshida | 345/690 |
| 2010/0295861 | A1 * | 11/2010 | Somerville et al. | 345/545 |
| 2010/0321376 | A1 * | 12/2010 | Takatori | 345/214 |
| 2011/0012883 | A1 * | 1/2011 | Nathan et al. | 345/211 |
| 2011/0012884 | A1 * | 1/2011 | Nathan et al. | 345/211 |
| 2011/0019137 | A1 * | 1/2011 | Ge et al. | 349/114 |
| 2011/0134094 | A1 * | 6/2011 | Nathan et al. | 345/211 |
| 2011/0134345 | A1 * | 6/2011 | Yamazaki et al. | 348/790 |
| 2011/0148949 | A1 * | 6/2011 | Matsui et al. | 345/690 |
| 2011/0164076 | A1 * | 7/2011 | Lee | 345/691 |

* cited by examiner

*Primary Examiner* — Srilakshmi K Kumar
*Assistant Examiner* — Michael J Jansen, II

(57) ABSTRACT

An active matrix liquid crystal display is addressed by a voltage larger than the voltage needed for the desired grey shades. A special control circuit is added to each pixel in the display in order to generate a decaying e-function as a boosting voltage for an accelerated transition into the desired grey scale. After the completed decay of this: e-function the driving voltage needed for the desired grey scale is provided by the control circuit.

4 Claims, 9 Drawing Sheets

The intra-pixel accelerator with a resistor R realized by the TFT 2

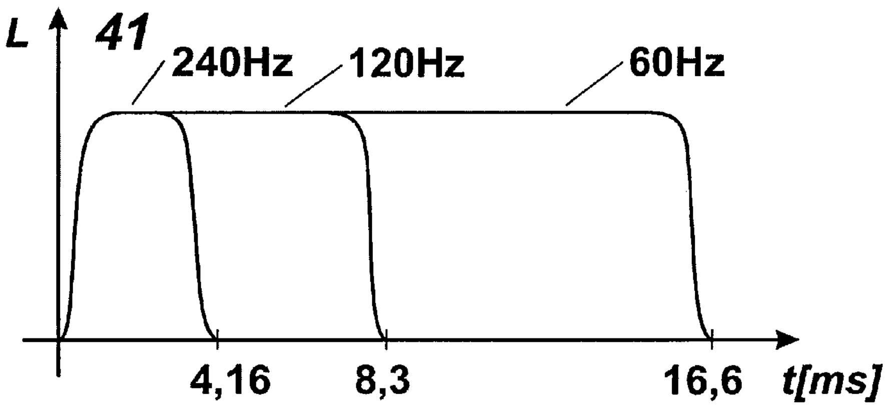
Fig. 1 Luminance in three different frame times for 60 Hz, 120 Hz and 240 Hz frames. Prior Art
Frame time $T_h = 1/f_f$, $f_f$ = frame freq.; 60Hz, $T_h$ = 16.6ms; 120Hz, $T_h$ = 8.3ms; 240Hz, $T_h$ = 4.16ms

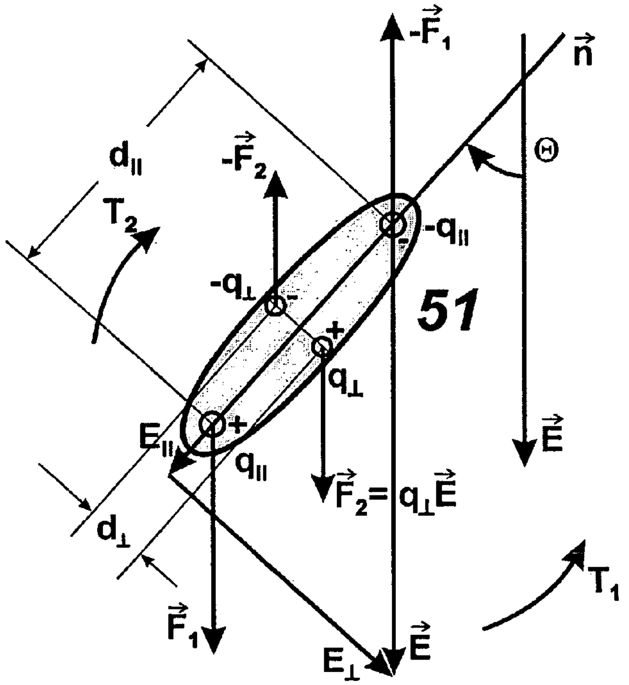
Fig. 2 The torque in the direction of Θ for VA cells with $e_{\perp} > e_{\parallel}$. Prior Art

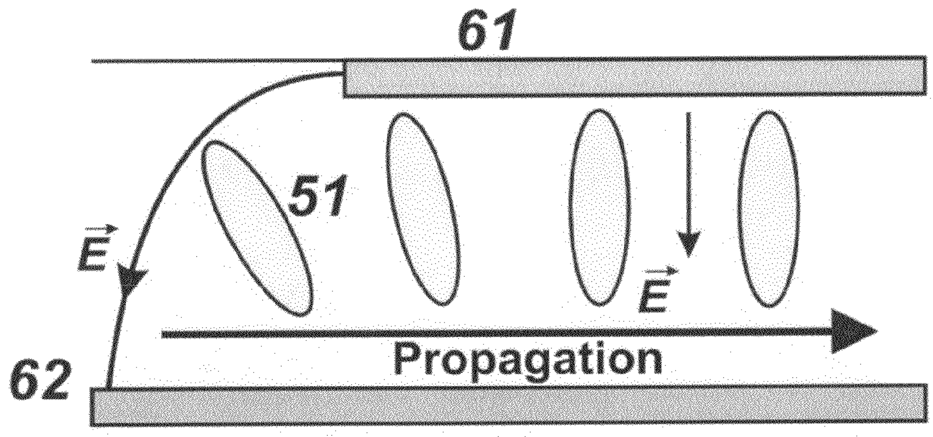
Fig. 3 Fringe field switching supported by the propagation of a mechanical wave. Prior Art

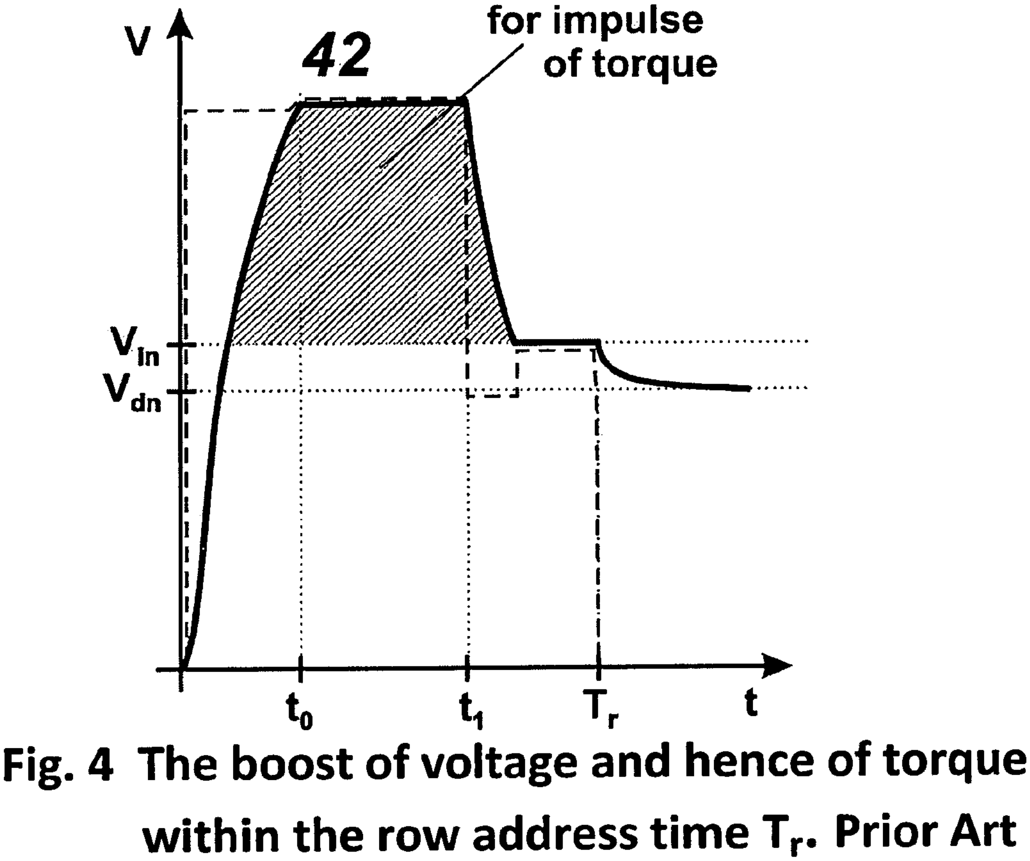
Fig. 4 The boost of voltage and hence of torque within the row address time $T_r$. Prior Art

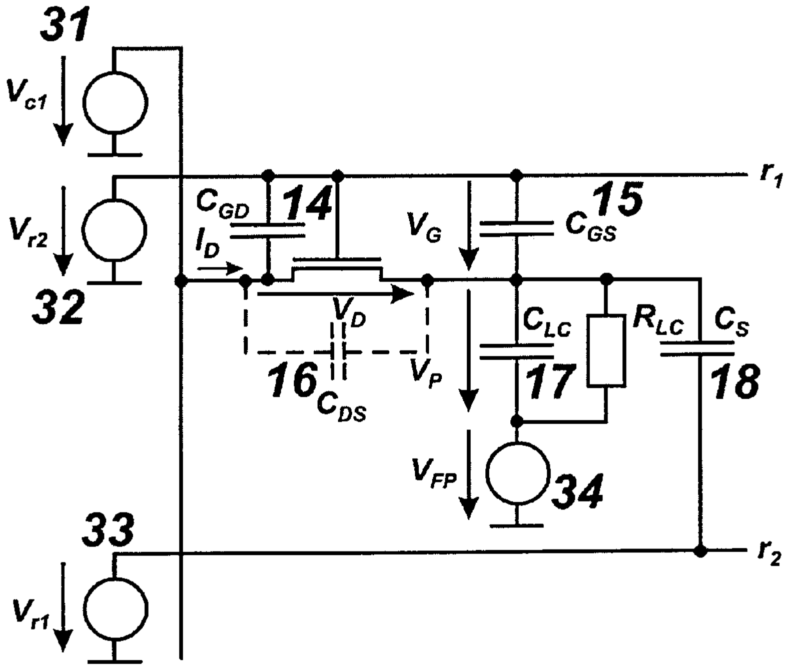
Fig. 5 The conventional addressing circuit for active Matrices. Prior Art

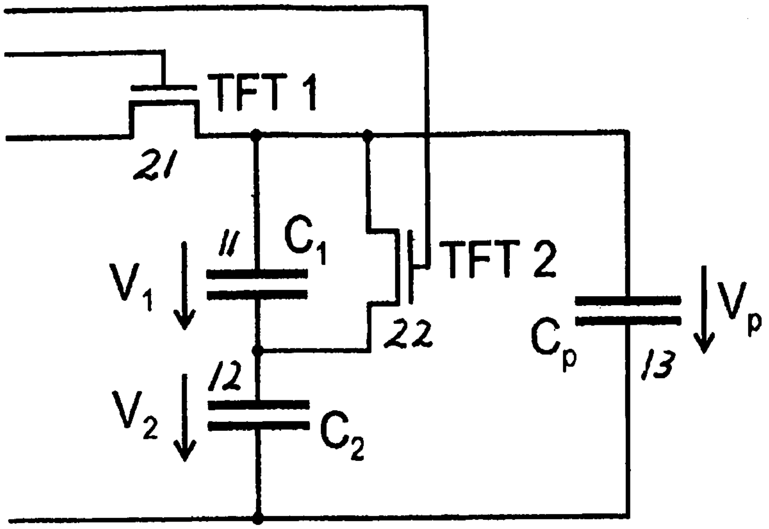
Fig. 6 The novel addressing circuit with an intra-pixel accelerator of the rise of luminance

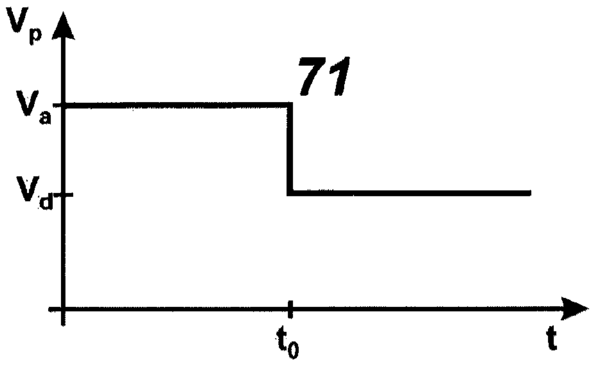
Fig. 7 Waveform of the pixel voltage $V_p$ for the new addressing scheme
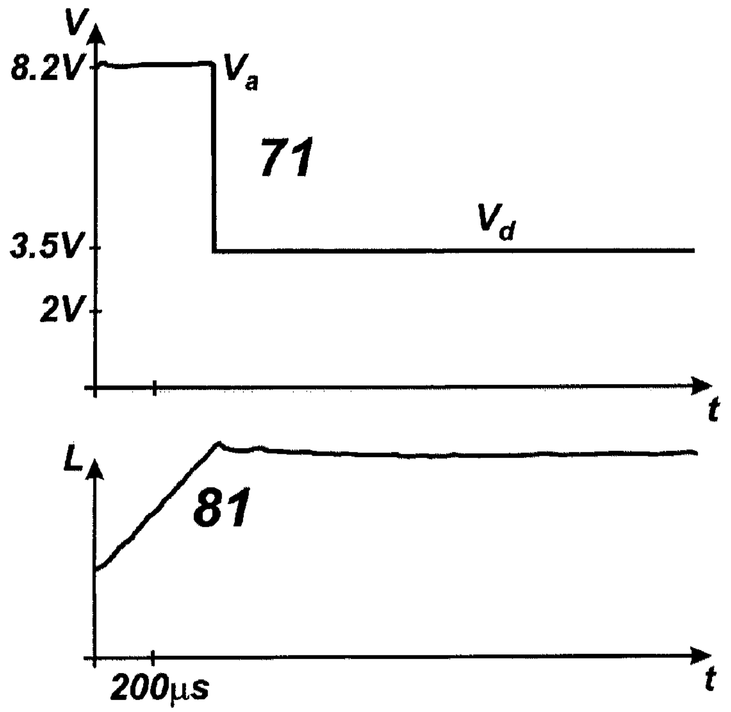
Fig. 8 Oscilloscope of luminance L and the addressing waveform V of the new addressing scheme

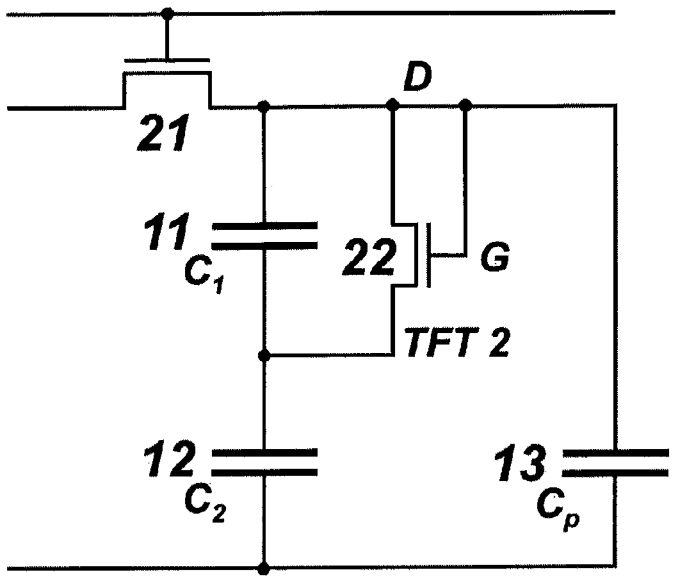
Fig. 9 The intra-pixel accelerator with a resistor R realized by the TFT 2
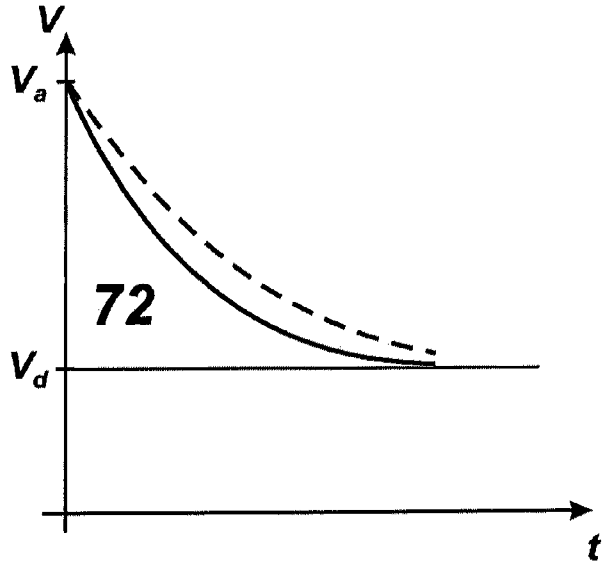
Fig. 10 The e-function of the discharge of $C_1$ with addressing circuit in Fig. 9

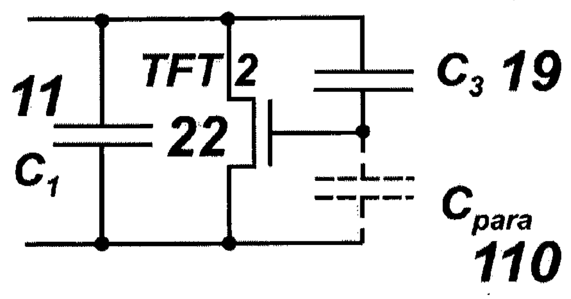
Fig. 11 The TFT 2 with a capacitor $C_3$ for a delayed discharge of $C_1$
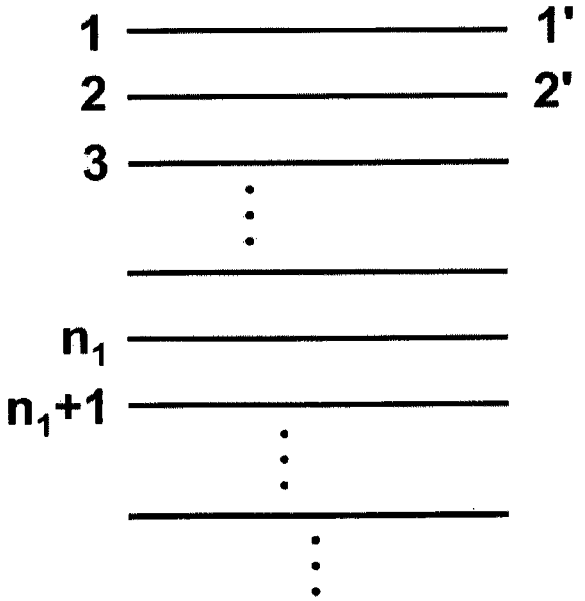
Fig. 12 The blocks of rows for the fast addressing with the conventional addressing circuit

MEANS AND CIRCUIT TO SHORTEN THE OPTICAL RESPONSE TIME OF LIQUID CRYSTAL DISPLAYS

REFERENCES CITED

[1] Li Y. et al., Fast response liquid crystal display using crossed fringe fields, JSID 16/10, p. 1069, 2008

[2] Lueder E., Liquid crystal displays—Addressing schemes and Electro-optical effects, 2nd ed. John Wiley, 2009

[3] Kahn F. J., Electric field induced orientational deformation of nematic liquid crystals: Tunable birefringence. Appl. Phys. Letters 21, p. 392, 1972 and U.S. Pat. No. 3,694,053

[4] Lien A. et al., Multidomain homeotropic liquid crystal display for active matrix addressing. Eurodisplay 21, 1993

[5] Lien A. et al., Ridge and fringe field multi-domain homeotropic liquid crystal display, SID 98, p. 1123, 1998

[6] Lien A. et al., Multi-domain homeotropic liquid crystal display based on ridge and fringe field structures. Jp. J. Appl. Phys. 37, p. 1597, 1998

[7] U.S. Pat. No. 5,907,380, May, 25, 1999; A. Lien, Liquid crystal cell employing thin wall pretilt control

[8] Song J. K. et al., DCCII: Novel method for fast response time in PVA mode. SID 04, p. 1344, 2004

[9] Kim K. H. et al., Wide UXGA TFT-LCD for HDTV, SID 04, p. 106, 2004

[10] Lueder E., Shortcomings and remedies of the AM addressing for LCDs and OLEDs. Workshop SID Asia Display/IMID, p. 65, 2004

[11] Lee B. W. et al., Reducing grey level response to one frame: dynamic capacitance compensation. SID 01, p. 1260, 2001

The present invention relates to a method for shortening the response time of liquid crystal displays. In particular driving circuits are described that achieve significant reductions in the response time of liquid crystal displays when working over a wide range of starting and ending light transmission levels (gray levels).

BACKGROUND OF THE INVENTION

In recent years, liquid crystal displays (LCDs) have come into widespread use as display devices for various types of imaging applications and for products such as personal computers and television sets. There is also the expectation that liquid crystal displays will find further use in stereoscopic 3D imaging as that technology comes into wider use.

However, because of the poor response characteristics of the liquid crystal itself, the LCDs have the potential problem of poor response time. In a typical display device such as used in a television or video imaging application the display is refreshed at a frame rate of 60 frames per second or every 16.7 milliseconds. Higher frame rates of 120 frames per second and 240 frames per second corresponding to 8.3 ms and 4.16 ms respectively are also becoming more common. The purpose of the higher frame rates is to reduce the effects of motion blurring when rapidly changing scenes are presented to the viewer. However, the higher frame rates can only be effective if the liquid crystal can be made to respond in correspondingly shorter times.

The term "optical response time" as used in the industry refers to the time needed for the luminance on the screen of a liquid crystal display (LCD) to rise from 10% of luminance to 90% of luminance. This term also can be used to describe luminance decay from 90% luminance to a 10% luminance. The decay time is typically different than the rise time. The luminance percentages are calculated by first measuring the total difference between the final value and the starting value of the luminance.

Some solutions to these poor response time problems with LCDs are disclosed, in for example, U.S. Pat. No. 6,778,160 B2.

A shorter response time for moving pictures provides a clearer contour or, in other words, less blurred edges. The blur has an additional independent cause and that is the holding time of a picture in a frozen state during the frame time $T_f$. This patent application focuses on the response time but has to take into account the implications of the holding time.

A further advantage of a short optical response is the full luminance being displayed longer during the frame time yielding a brighter picture or a lower and hence more power-saving backlight.

The long enough presentation of the full luminance during the frame time $T_f$ is the harder to realize the shorter the frame time which is needed to reduce blur. This is depicted in FIG. 1. Therefore shorter frame times also necessitate shorter response times.

The decay of the luminance was for a long time given by the relatively long relaxation time of the LC-material in the area of 25 ms. It could be shortened to around 1 ms by the introduction of an additional electric field [1]. This fact is already included in the decay in FIG. 1 together with the short rise time. The consequence of short rise times and short decay times is that the luminance at the end of the frame time can become zero without sacrificing a long time of full luminance. The zero luminance at the end of the frame eliminates the need for a very costly frame memory for the initial condition of the next frame.

Therefore, the invention as described in this patent is intended to reduce the optical response time so as to reduce blur, enhance luminance, and reduce the power dissipation of the backlight while eliminating the need for a costly frame memory.

Specifically, the desired target for a shortened response time is approximately 0.2. to 0.4 milliseconds. This is calculated for TV systems with a frame rate of 240 Hz. This frame rate is needed to improve image quality for fast moving images and also to be able to present 3D images. The frame time for 240 Hz is 4.16 milliseconds. If it is desired to achieve full black to white luminance in approximately 20% of this time then the response of the LC cell should be no more than 0.8 milliseconds. However, for smaller luminance changes the driving voltage will be less and the response time will have to be correspondingly shorter with 0.2 to 0.4 milliseconds as a desirable target value.

Prior art methods have tried to accomplish this improved response time by a number of different techniques. One is to align the LC molecules with a slight pre-tilt of around seven degrees. This avoids having zero initial torque on the molecules when an electric field is applied. However, due to manufacturing variations this technique is not fully successful in achieving response times below about 30 milliseconds.

Another method involves fringe field switching and requires a structure where there is an edge to the electrode in each pixel. This can result in limitations to the optimal pixel layout and from achieving maximum luminance. This method, however, has been shown to shorten response times to below approximately 15 milliseconds.

A third known method is to apply an offset voltage of 1 volt to 2.5 volts to the black level. This voltage is kept below the threshold where gray shades would begin to appear. However, this method does not further reduce the response time for modulation between gray levels.

A fourth known method is to reduce the cell gap spacing from the conventional range of approximately 3.5 to 5 microns to the range of 2 microns. However, the disadvantage of this technique is that there is a reduction in manufacturing yield and therefore increased cost because of the tighter tolerances for cell spacing.

A further known technique is to try to boost the voltage within the addressing time according to FIG. 4. However, there is typically not enough addressing time available for television frame rate displays. In a typical TV display with 1080 rows presented with a 60 Hz frame rate, the addressing time per row is only 15.43 microseconds, which is too short to be effective.

Applying a combination of these methods can result in shortened response times in the approximate range of 5 milliseconds. This is still insufficient compared to the desired response time of approximately 0.2 to 0.4 milliseconds so as to achieve the correct luminance response between gray levels in sequential frames.

To overcome these limitations, a special signal processing circuit is described herein that is included within each pixel and applies a modified voltage beyond the addressing time but within each frame time.

SUMMARY OF THE INVENTION

To achieve the above mentioned objectives, a feature of the present invention includes a liquid crystal display with a plurality of picture elements arranged in a matrix of rows and columns. The display has two opposed substrates, a common electrode on one substrate, and picture elements having driving electrodes on the opposing substrate. The picture elements comprise a plurality of parallel and spaced apart data lines and substantially orthogonal signal lines insulated from each other and at each intersection a first driving electrode and an associated intermediate component for coupling the data lines and the corresponding electrodes, where a voltage is applied sequentially to the signal lines such that a first TFT at each pixel in a row of pixels is made conductive and driving voltages are applied to the data lines such that enlarged voltages $V_a=kV_d$ with k>1 are applied sequentially to the input of the addressing circuit of each data line, where $V_d$ is the desired voltage for a given grey shade and $V_a$ is the enlarged voltage for the acceleration of the rotation of the LC-molecules.

Another feature of the present invention includes a liquid crystal display device having a plurality of picture elements arranged in a matrix of columns and rows where a first substrate and a second substrate face each other and are spaced apart for defining a cell gap between both said substrates with at least one of the substrates being transparent. A plurality of parallel and spaced apart data lines and substantially orthogonal signal lines insulated from each other and at each intersection a first driving electrode and an associated intermediate component means for coupling said data line to said corresponding first electrode are all formed on the surface of said first substrate facing said second substrate. There is a circuit for applying a voltage sequentially to the signal lines such that a first TFT at each pixel in a row of pixels is made conductive and a control circuit where signal processing takes place within the signal addressing circuit with the additional components of series connected capacitors $C_1$ and $C_2$ across the LC-pixel and an additional TFT across $C_1$ with the second TFT controlled by a gate signal fed from an external voltage source and, a liquid crystal material filling the space between said substrates.

Yet another feature of the present invention is further characterized by a liquid crystal display control circuit where the N rows are sub-divided into blocks with $N_r$ rows where $\Sigma N_r=N$. so that the blocks are addressed simultaneously and independently of each other so as to provide the enlarged voltages $V_a$ followed by the desired voltage $V_d$.

These and other features of the present invention are described more fully in the detailed description of the invention presented below.

BRIEF DESCRIPTION OF THE DRAWINGS

FIG. 1 shows the luminance in three different frame times for 60 Hz, 120 Hz, and 240 Hz.

FIG. 2 shows the torques $T_1$ and $T_2$ for VA cells with epsilon in the parallel direction less than epsilon in the perpendicular direction.

FIG. 3 illustrates the fringe field switching supported by the propagation of a mechanical wave.

FIG. 4 is a graph showing the boost voltage and hence a boost of torque within the row address time.

FIG. 5 is a diagram of the conventional addressing circuit for active matrices including parasitic capacitance components.

FIG. 6 is a diagram illustrating the novel addressing circuit with an intra-pixel accelerator of the rise of luminance.

FIG. 7 is a graph showing the waveform of the pixel voltage for the new addressing scheme.

FIG. 8 is an example of an oscilloscope measurement of the luminance over time and the addressing waveform for the new addressing scheme.

FIG. 9 shows the circuit schematic for the intra-pixel accelerator with a resistor R realized by the TFT 2.

FIG. 10 is a graph of the e-function of the discharge of C1 with the addressing circuit of FIG. 11 is the circuit schematic showing the TFT 2 with a capacitor C3 for a delayed discharge of C1.

FIG. 12 is a graph of the blocks of rows for the fast addressing with a conventional addressing circuit.

DETAILED DESCRIPTION OF THE INVENTION

Luminance on an LCD is changed by changing the orientation of the LC-molecules, which are rotated by a torque T generated by an electric field E, where $$T=\tfrac{1}{2}\epsilon_0(\epsilon_{\parallel}-\epsilon_{\perp})E^2\sin 2\Theta \quad (1)$$

$$E=V_p/d \quad (2)$$

$\epsilon_0$ is the absolute dielectric constant; $\epsilon_{\parallel}$ and $\epsilon_{\perp}$ are the relative dielectric constants parallel and perpendicular to the director n of an LC-molecule 51 in FIG. 2, while $\Theta$ is the angle from E to n. $V_p$ is the voltage across the pixel with the cell gap d. It is known that for $\epsilon_{\perp}>\epsilon_{\parallel}$ the torque T has the direction of $\Theta$ [2].

In a preferred cell for TV the LC-molecules are vertically aligned (VA) with respect to the substrates 61, 62, as on the right side of FIG. 3. Obviously for this case $\Theta=0$ resulting in T=0. In order to initiate a rotation the LC-molecules need a small pre-tilt off the normal or the electric field E requires a small component perpendicular to the normal [3]. This way a response time of around 35 ms can be reached.

For a response time quoted from now on, unless stated otherwise, the response is from black to fully white. As fully white requires the largest voltage or the largest E-field in eq. (1), the torque is largest and the pertinent optical response time is shortest. This situation changes for switching from a given grey shade to a closely neighboring grey shade, because the voltage and hence the torque to achieve only a small rotation of the molecules is also small. This results in a considerably longer response time, which in many cases is longer than the frame time. Therefore, for small intra-grey changes the desired steady state may not even be reached within a frame time. So far there is no satisfactory solution to this intra-grey problem and that is why it attracts special attention by this patent application.

As known in the art a faster response is obtained by fringe field switching [4] [5] [6] [7], where the E-field at the edge of an electrode in FIG. 3 applies a torque also to perpendicular molecules which rotate and push the other molecules also sideways. This results in a mechanical wave propagating to the right in FIG. 3, yielding a response time shortened to around 15 ms.

The zero voltage $V_p$ across a pixel representing the black state can be replaced by a small voltage in the range of 1V to 2.5V in order to rotate the LC-molecules into a small pre-tilt off the normal. However it is small enough to not yet degrade the black state. Now an addressing voltage on top of this black state voltage generates, due to a larger Θ in eq. (1) stemming from the pre-tilt, a large torque, which decreases the response time [8].

As known in the art a smaller cell gap yielding for the same $V_p$ a larger E is another solution for a faster rise of luminance. As the torque $T \sim E^2$ the response time is also reduced by a quadratic divisor. This powerful means with cell gaps in the range of 2 μm instead of the conventional 3.5 μm, has the shortcoming of requiring a more demanding clean room technology in order to fight the risk of a lower fabrication yield. It is however frequently used at increased fabrication cost.

A boost in voltage in the addressing waveform 42 in FIG. 4 resulting in a boost in torque also reduces the response time quadratically [2] [8] [9] [10]. This effect has to take place during the row address time $$T_r = T_f / N \tag{3}$$

where $T_f$ is the frame time and N stands for the number of rows. For a 60 Hz frame with $T_f = 1/60$ ms=16.66 ms and a HDTV system with N=1080 rows, $T_r$=15.43 μs; for a 120 Hz frame and a QSXGA TV system with 2048 rows, $T_r$=4.06 μs. This indicates a very small time available for the boost resulting also in an only small decrease of the response time. The combined effect of a small cell gap, the elevated starting voltage and the boost in the addressing voltage yields an optical response time from black to fully white of 5 ms. This is still too large to meet all the goals defined in paragraph 2. Another not satisfactorily solved problem is the slow intra-grey transition.

The conventional pixel addressing circuit is shown in FIG. 5, where the parasitic components are also included. The novel addressing circuit for the acceleration of the rotation of the LC-molecules is located within the pixel as shown in FIG. 6. In the row address time $T_r$ the external column voltage Va charges the capacitors $C_1$ 11, $C_2$ 12 and $C_p$ 13 while TFT1 21 is conductive due to a high enough voltage $V_r$. The TFT2 22 is blocked by a negative voltage $V_c$. The desired voltage across $C_p$ 13 to realize a given grey shade is $V_d$. Va is the boost voltage given by $$V_a = kV_d \tag{4}$$

with k>1. After charging the capacitors to Va the addressing can leave this row and turn to the next row. This charging, if necessary by overdrive, can be performed in the μs range as conventionally done.

We now keep the high voltage $V_a$ for a longer time $t_0$ in FIG. 7 in the ms range, without the need for a longer address time. After having provided a long enough boost in torque the TFT2 22 is rendered conductive by applying a positive gate voltage $V_c$. This discharges $C_1$ and slightly recharges $C_2$ and $C_p$ to different voltages which are certainly lower than than $V_a$. The steady state voltage across the pixel is required to be $V_d$. Solving the pertinent linear differential equations provides the steady state solution with the voltage $V_d$ across the pixel after the discharge of $C_1$ as $$V_d = \frac{1}{1 + C_2/C_1} V_a + \frac{1}{1 + C_1/C_2} \frac{1}{1 + C_2/C_p} V_a \tag{5}$$

The time constant T for the transient is $$T = R \frac{C_1 + C_2 + C_1 C_2 / C_p}{1 + C_2/C_p} \tag{6}$$

where R is the on-resistance of TFT2. This yields $$\frac{V_d}{V_a} = \frac{1}{k} = \frac{1}{1 + C_2/C_1} + \frac{1}{1 + C_1/C_2} \frac{1}{1 + C_2/C_p} \tag{7}$$

Solving for $C_1$ provides $$C_1 = \frac{kC_p/(C_2 + C_p) - 1}{1 - k} C_2 \tag{8}$$

with a free parameter $C_2$ ensuring a positive $C_1$.

One could also solve Riccatti's nonlinear differential equation for a nonlinear R in order to obtain a slightly more precise result.

As an example, for a given LC cell with a cell gap of 3.5 micrometer and a chosen k=2.34 as well as $C_2$=16.08 fF, $C_1$=12, fF, $t_0$=400 microseconds and a starting voltage of 2.8 V at the cell we obtain the voltage V and the luminance L both versus t in FIG. 8. The 10% to 90% response time of luminance L is 370 microseconds=0.37 ms. This is a very small value for the most demanding case that is a rise between small voltage differences from 2.8 V to 3.5 V. For these differences, as a rule, the frame times are too short for reaching the final value of luminance L. For a commonly used cell with a cell gap of 2 micrometers the response time is by a factor $(3.5/2)^2$ shorter resulting in 120 microseconds. This compares very well with the usually reached 5 ms.

The accuracy for k in eq. (7) and hence for the desired voltage $V_d$ depends only on ratios of capacitances. If capacitors are fabricated at the same location, in this case in the tiny pixel area, the deviations, especially those in thickness, are all the same and cancel in the ratios. If there should be a remaining error the dynamic capacitance compensation [11], which regularly has to be done at the end of the row address time $T_r$ by adjusting $V_d$ offers a chance for correction. For this the remaining error has to be determined, best by measuring.

The capacitors $C_1$ 11 and $C_2$ 12 can also serve as storage capacitors $C_s$ 18 in FIG. 5 which are always needed.

The advantages of the intra-pixel accelerator circuit are:

- an optical response time of only <0.5 ms at a cell gap of 2 micrometers that is at least 10 times faster than the known 5 ms solutions for d=2 μm also the transition between closely neighboring grey shades can be remarkably accelerated the conventional row address time $T_r$ does not have to be increased resulting in a less costly realization of 240 Hz frames needed for blur reduction cell gaps larger than 2 μm are acceptable yielding a less costly fabrication desired luminance is displayed during most of the frame time yielding brighter pictures or a reduced power dissipation by the backlight.

The disadvantage is an added TFT with its gate address line and an added capacitor.

The 2nd circuit solution shown in FIG. 9 eliminates the gate address line. The capacitors in FIG. 9 are again charged to the boost voltage $V_a=kV_d$, but this time with a larger k. The TFT2 22 in FIG. 9 with a short between the drain and the gate works as a resistor R, which immediately after charging to $V_a$ in FIG. 10 starts to discharge $C_1$ resulting finally in the voltage $V_d$ across $C_p$ 13 as in the previous solution. The time constant T for the discharge is $$T = \frac{R(C_p + C_1 + C_1 C_p / C_2)}{1 + C_p / C_2} \tag{9}$$

while $C_1$ 11 for a selected k and $C_2$ 12 is $$C_1 = \frac{C_2(C_2 + C_p(1-k))}{(C_2 + C_p)(k-1)} \tag{10}$$

The most effective time constant and the factor k are best determined by measurements. The optical response times achieved with this approach tend to be somewhat longer than in the 1st solution. However this 2nd solution has the advantage that no 2nd gate line in the rows is needed. The discharge in FIG. 10 can be delayed, as indicated by a dashed line, if the capacitor $C_3$ 19 at the TFT2 22 in FIG. 11 are added. $C_3$ is charged together with the parasitic capacitor $C_{para}$ 110 of the TFT2 22 and lowers the potential at the gate resulting in a slower discharge until $C_3$ is discharged through the drain-gate portion of the channel. The dashed line discharge provides more torque.

A 3rd solution eliminates the added components, namely a capacitor and the TFT 2 22, but can only function with a shorter row address time. The conventional addressing circuit in FIG. 5 is used. The increased voltage $V_a$ charges all capacitors, in row 1 in FIG. 12 whereupon the next row is addressed. The voltage $V_a$ stays for a time $t_o$ as in the 1st solution. After this time the addressing of rows has reached row $n_1=t_0/T_r$. Now we have to write-in the desired voltage $V_d$ into the 1st row, which is indicated by 1' in FIG. 12. As we can accommodate only one voltage on a column line, each write-in for $V_a$ and for $V_d$ has to be completed separately in half the row address time $T_r$. An alternative would be providing the row address time $2T_r$, but then only half the number of rows could be addressed.

The writing of $V_a$ into row $n_1+1$ is continued, followed by $V_d$ into row 2 etc., the latter indicated by 2' in FIG. 12. This method has the advantage that the value of $V_a$ can be selected with a different factor k for each pixel, allowing for very large k-values for low intra-grey transitions to a new $V_d$ That way these transitions can also be performed very fast.

The double speed addressing of this solution can be avoided by interrupting the columns at each block of $n_1$ rows. Then always 2 blocks are addressed simultaneously one for $V_a$ and the other one for $V_d$. However this requires two data sources, one for $V_a$ and one for $V_d$; in addition the sources have to be switched to the individual blocks.

As described above, according to the invention, response time can be improved and circuit complexity reduced.

While the invention has been described in terms of certain embodiments thereof, it is not intended that it be limited to the above description, but rather only to the extent set forth in the following claims. The embodiments of the invention in which exclusive property or privilege is claimed are defined in the appended claims.

I claim:

1. An active matrix liquid crystal display having a plurality of picture elements arranged in rows and columns comprising:

a first substrate and a second substrate opposing the first substrate defining a cell gap between said first and second substrates having a liquid crystal layer disposed there between, at least one of the first substrate or the second substrate being transparent, a plurality of pixel control circuits at each intersection of rows and columns, each of the pixel control circuits comprising:

a first transistor, a plurality of video signal voltage lines lying in columns of the display and carrying an enlarged voltage(Va), the enlarged voltage being larger than a desired voltage(Vd) needed for a desired grey scale in each pixel, and a plurality of scan lines connected to a first gate line of the first transistor, each row allowing for the enlarged voltage rather than the desired voltage needed for the desired grey scale of each pixel and allowing the enlarged voltage to work as a boosting voltage accelerating the transition into a desired grey scale, to charge the pixels, and the pixel control circuits able to change the enlarged voltage into the desired voltage needed for the desired grey scale, thereby ending the effect of the boosting voltage within a frame time allocated for a time-sequential writing of the enlarged voltage larger than needed for the desired grey scale into all rows of the display; and the plurality of column and row lines occupied with an addressing voltage of the rows with the enlarged voltage being larger than the desired voltage needed for the desired grey scale, the plurality of column and row lines not being available for changing to the desired voltage needed for the desired grey scale, and applying the enlarged voltage, the enlarged voltage being larger than the desired voltage required for a desired grey scale in the pixels and accelerating the transition into the desired grey scale and changing the enlarged voltage into the desired voltage needed for a given grey scale, the plurality of pixel control circuits further comprising:

a first capacitor directly connected to a drain of a second transistor and a liquid crystal pixel and a second capacitor, the first capacitor being parallel to the second transistor, the first capacitor directly connected in series to the second capacitor, the series connected first capacitor and second capacitor being placed in parallel to the liquid crystal pixel, the second transistor having a short between the drain and gate, a source of the second transistor directly connected between the series connected first capacitor and second capacitor, the first capacitor and second capacitor being charged to the boosting voltage, the short between the drain and gate of the second transistor creating, a resistance to eliminate the need for a second gate line, a discharging of the first capacitor and an e-function which decays rapidly over time.

2. The pixel control circuit according to claim 1, wherein a division of the rows of the display are subdivided into different groups each containing a number of rows most closely as possible to an equal number of rows in each group and all groups being simultaneously and independently addressed by separate voltage sources, with the enlarged voltages being larger than the desired voltage needed for the desired grey scale in the pixels of these groups and this addressing step being followed still within the frame time of the images by the addressing with the enlarged voltage being equal to the desired voltage needed for a given grey scale of the pixels in the groups.

3. The pixel control circuits according to claim 1, wherein the second transistor is replaced by a resistor, the first and the second capacitors being charged by the boosting voltage and the resistor discharging the first capacitor creating the boosting voltage given by an e-function decaying over time as rapidly as determined by the values of the resistor and of the first capacitor thus providing an increased torque to the liquid crystal.

4. An active matrix liquid crystal display having a plurality of picture elements arranged in rows and columns comprising:

a first substrate and a second opposing substrate defining a cell gap between said first and second substrates having a liquid crystal layer disposed there between, the two substrates having at least one of the substrates being transparent, a plurality of pixels circuits at each intersection of rows and columns, each of the pixel circuits comprising:

a first transistor, a plurality of video signal voltage lines lying in columns of the display and carrying an enlarged voltage (Va) larger than a desired voltage (Vd) needed for a desired grey scale in each pixel, and a plurality of scan lines connected to a first gate line of the first transistor, each row allowing for the enlarged voltage rather than the desired voltage needed for the desired grey scale of each pixel and allowing the enlarged voltage to work as a boosting voltage accelerating the transition into a desired grey scale, to charge the pixels, and a pixel control circuit able to change the enlarged voltage into the desired voltage needed for the desired grey scale, thereby ending the effect of the boosting voltage within a frame time allocated for a time-sequential writing of the enlarged voltage larger than needed for the desired grey scale into all rows of the display; and the plurality of column and row lines occupied with an addressing voltage of the rows with the enlarged voltage being larger than the desired voltage needed for the desired grey scale, the plurality of column and row lines not being available for changing to the desired voltage needed for the desired grey scale, and applying the enlarged voltage, the enlarged voltage being larger than the desired voltage required for a desired grey scale in the pixels accelerating the transition into the desired grey scale and changing the enlarged voltage into the desired voltage needed for a given grey scale, the pixel control circuits further comprising:

a first capacitor, and a second transistor, wherein the second transistor is parallel to the first capacitor and the first capacitor being connected directly across a source and a drain of the second transistor, a second capacitor connected directly between the source and a gate of the second transistor, the second capacitor being charged together with a parasitic capacitance generated between the gate and drain of the first transistor thereby lowering the potential at the gate of the second transistor resulting in a slower discharge and shaping a decaying e-function into a slow decay and becoming faster over time as the decay enhances the boosting effect of the decaying e-function thereby providing more torque to the liquid crystal.

* * * * *